US010989551B2

(12) United States Patent
Schmidt et al.

(10) Patent No.: US 10,989,551 B2
(45) Date of Patent: Apr. 27, 2021

(54) REDUCING HVAC LOADS FOR RIDESHARE VEHICLES

(71) Applicant: GM Cruise Holdings LLC, San Francisco, CA (US)

(72) Inventors: Michael Schmidt, Scottsdale, AZ (US); Chase Kaufman, Fountain Hills, AZ (US); Sriram Salem Kannan, San Francisco, CA (US); Justin Henry Leder, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 228 days.

(21) Appl. No.: 16/410,536

(22) Filed: May 13, 2019

(65) Prior Publication Data

US 2020/0363224 A1 Nov. 19, 2020

(51) Int. Cl.
*G01C 21/34* (2006.01)
*G01C 21/36* (2006.01)
*G05D 1/02* (2020.01)
*G05D 1/00* (2006.01)

(52) U.S. Cl.
CPC ..... *G01C 21/3469* (2013.01); *G01C 21/3691* (2013.01); *G05D 1/0088* (2013.01); *G05D 1/0212* (2013.01); *G05D 1/0291* (2013.01); *G05D 2201/0213* (2013.01)

(58) Field of Classification Search
CPC ............ G01C 21/3469; G01C 21/3691; G01C 21/3461; G01C 21/3453; G01C 21/3407; G01C 21/34; G05D 1/0212; G05D 1/0291; G05D 1/0088; G05D 2201/0213
See application file for complete search history.

(56) References Cited

U.S. PATENT DOCUMENTS

| 2018/0203443 | A1* | 7/2018 | Newman | B60L 1/00 |
| 2018/0356242 | A1* | 12/2018 | Kritzmacher | B60W 50/0097 |
| 2019/0219412 | A1* | 7/2019 | Melatti | G01C 21/3667 |
| 2019/0265045 | A1* | 8/2019 | Baik | G05D 1/0274 |

\* cited by examiner

*Primary Examiner* — Aaron L Troost
(74) *Attorney, Agent, or Firm* — Polsinelli, PC

(57) ABSTRACT

Systems and methods provide for reducing power draw in an autonomous vehicle. A level of sunlight can be received based on an amount of light captured by one or more sensors. The level of sunlight can be mapped to a geographical area to generate a map of shaded areas, and based on a temperature within the autonomous vehicle being outside a temperature range, the autonomous vehicle can be routed based on the map of shaded areas to bring the autonomous vehicle within the temperature range.

20 Claims, 4 Drawing Sheets

REDUCING HVAC LOADS FOR RIDESHARE VEHICLES

TECHNICAL FIELD

The subject matter of this disclosure relates in general to the field of rideshare vehicles, and more particularly, to systems and methods for temperature management in an autonomous rideshare vehicle.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Autonomous vehicles can be operated within a fleet of vehicles. Since autonomous vehicles can be electric, requiring the autonomous vehicles to be charged, any kind of charging infrastructure could be benefited by saving power draw during the autonomous vehicle's operation. Reducing power draw, such as power devoted to heating and air conditioning systems, can have cascading effects across the entire fleet.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for reducing the costs of operating autonomous vehicles. A large use of power is heating, ventilation, and air conditioning (HVAC) systems. For example, on electric vehicles, especially in cold climates, the heater can consume large amounts of power because there's no internal combustion engine to take the waste heat from. In some cases, depending on the outside climate, up to a third of total power from the battery can be a result of the HVAC system. What is needed to save power is a way to reduce the operation of HVAC systems.

Figure 1:
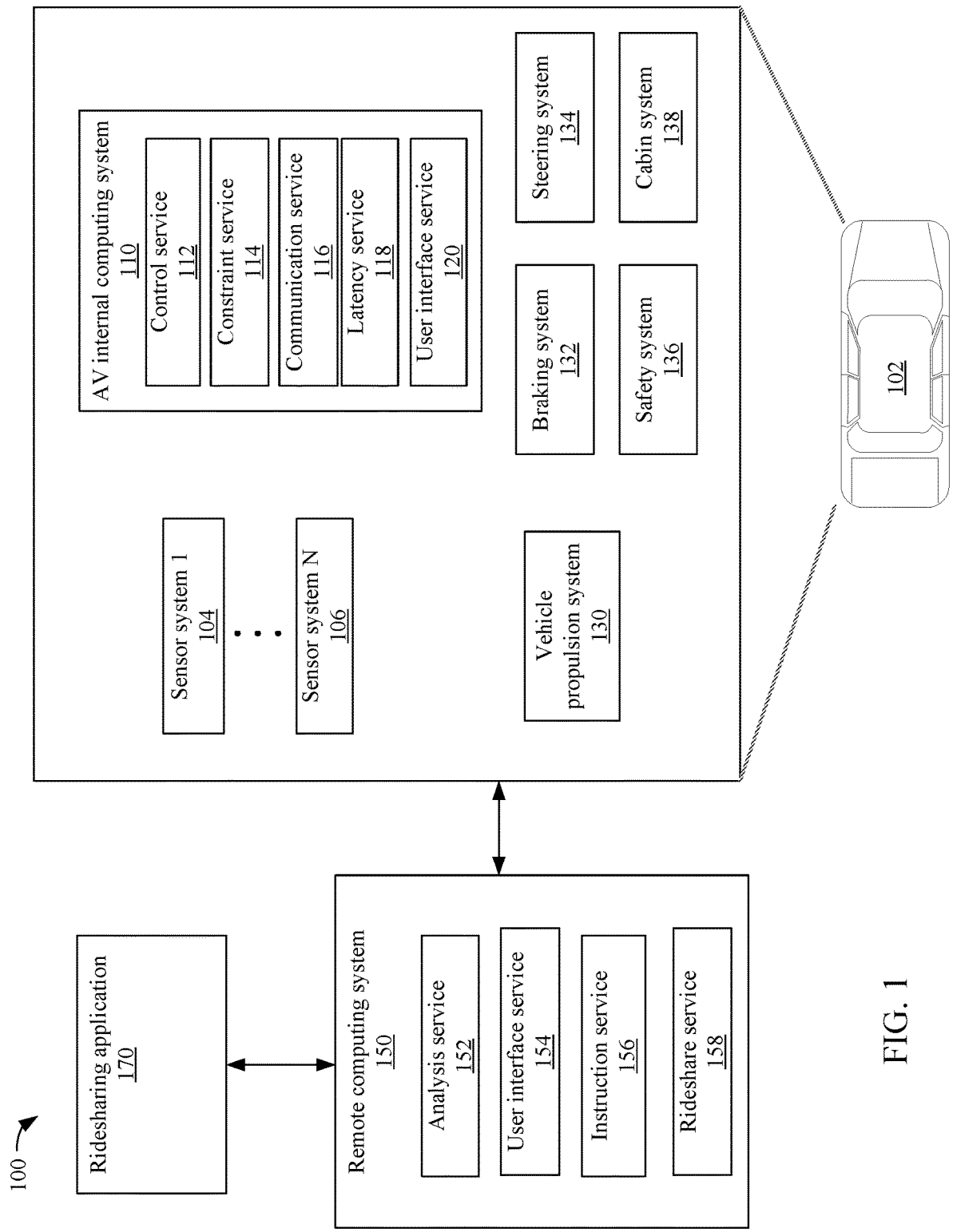
FIG. 1 illustrates an example schematic diagram of an autonomous vehicle and network environment, in accordance with some embodiments.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) internal computing system 110 that is in communication with the sensor systems 104-106 and the mechanical systems 130, 132, 134. The AV internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, ridesharing pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

Figure 2:
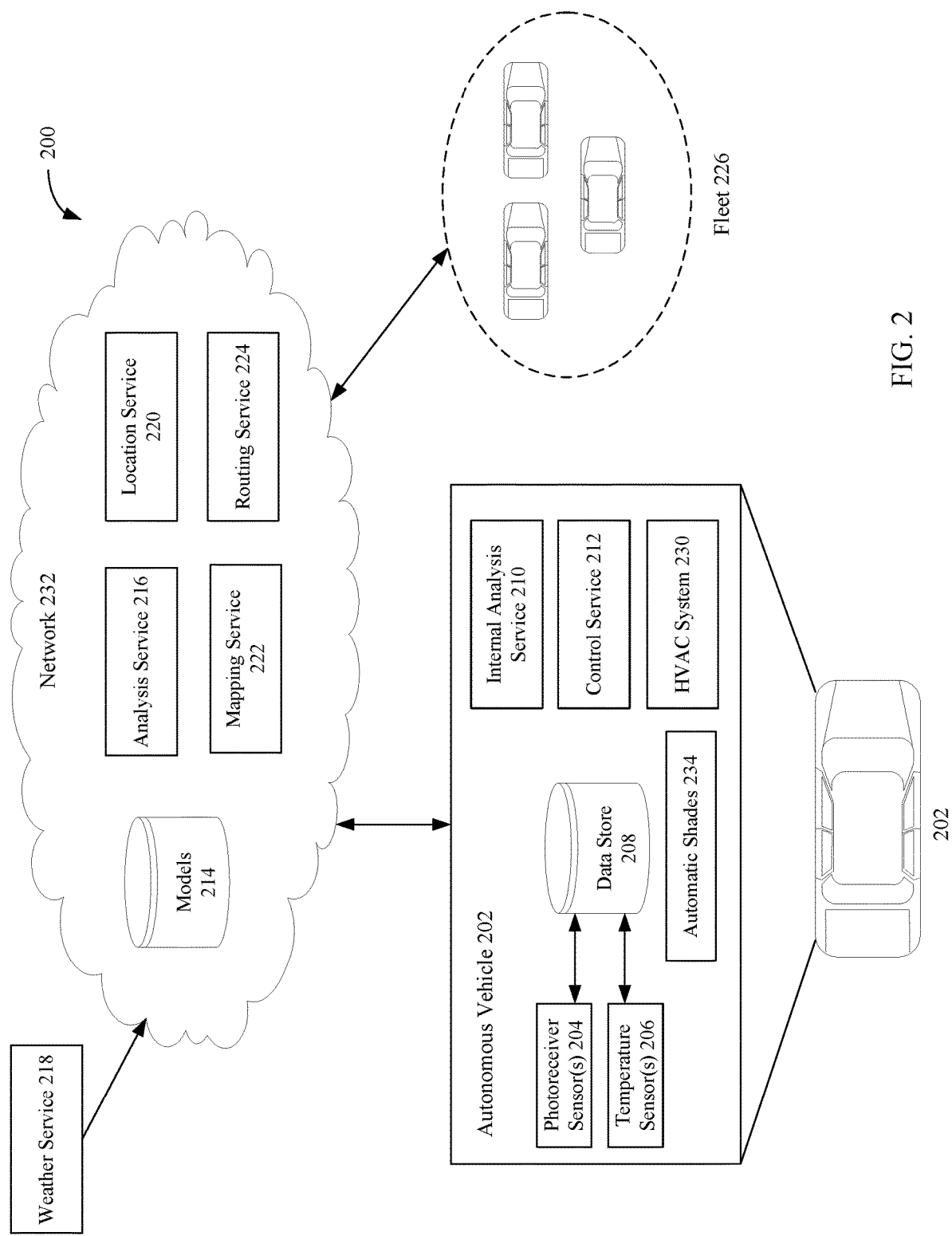
FIG. 2 illustrates an example schematic diagram of an autonomous vehicle and network environment that reduces power draw, in accordance with some embodiments.

FIG. 2 illustrates an example schematic diagram of an autonomous vehicle 202 and network environment that reduces power draw for interior temperature management, such as reducing power to a heating, ventilation, and air conditioning (HVAC) system 230, in accordance with some embodiments. System 200 can, for example, reduce HVAC system 230 power draw in autonomous vehicle 202 by receiving a level of sunlight based on an amount of light captured by one or more sensors. The level of sunlight can be mapped to a geographical area to generate a map of shaded areas and, based on a temperature within autonomous vehicle 202 being outside a temperature range, the autonomous vehicle 202 can be routed based on the map of shaded areas to bring the autonomous vehicle 202 back within the temperature range. This reduces the need to turn on an HVAC system 230 for thermal comfort within autonomous vehicle 202, thus saving power since the sun (or lack of it) can heat or cool the interior of autonomous vehicle 202 instead of HVAC system 230, respectively.

System 200, for example, can include autonomous vehicle 202 in communication with network 232, which can provide routing services for autonomous vehicle 202. Autonomous vehicle 202 can be part of fleet 226 that includes any number of autonomous vehicles. Temperature can be managed within the interior of the autonomous vehicles by routing autonomous vehicles through (or to) shady areas when the autonomous vehicles need to cool down, and/or routing autonomous vehicles through (or to) sunny areas when the autonomous vehicles need to warm up. In some embodiments, autonomous vehicle 202 can detect the level of light (e.g., irradiance, radiant energy, radiant flux, intensity, etc.) that is incident on autonomous vehicle 202. At the same time, autonomous vehicle 202 can detect temperature within autonomous vehicle 202 as it is operating. This data can be collected and mapped to specific geographical locations, which can then inform routes autonomous vehicle 202 can take in order to maintain a consistent temperature range. Elements of the autonomous vehicle 202, the network 232, and the fleet 226 will be discussed in greater detail with respect to the various method steps in FIG. 3.

Figure 3:
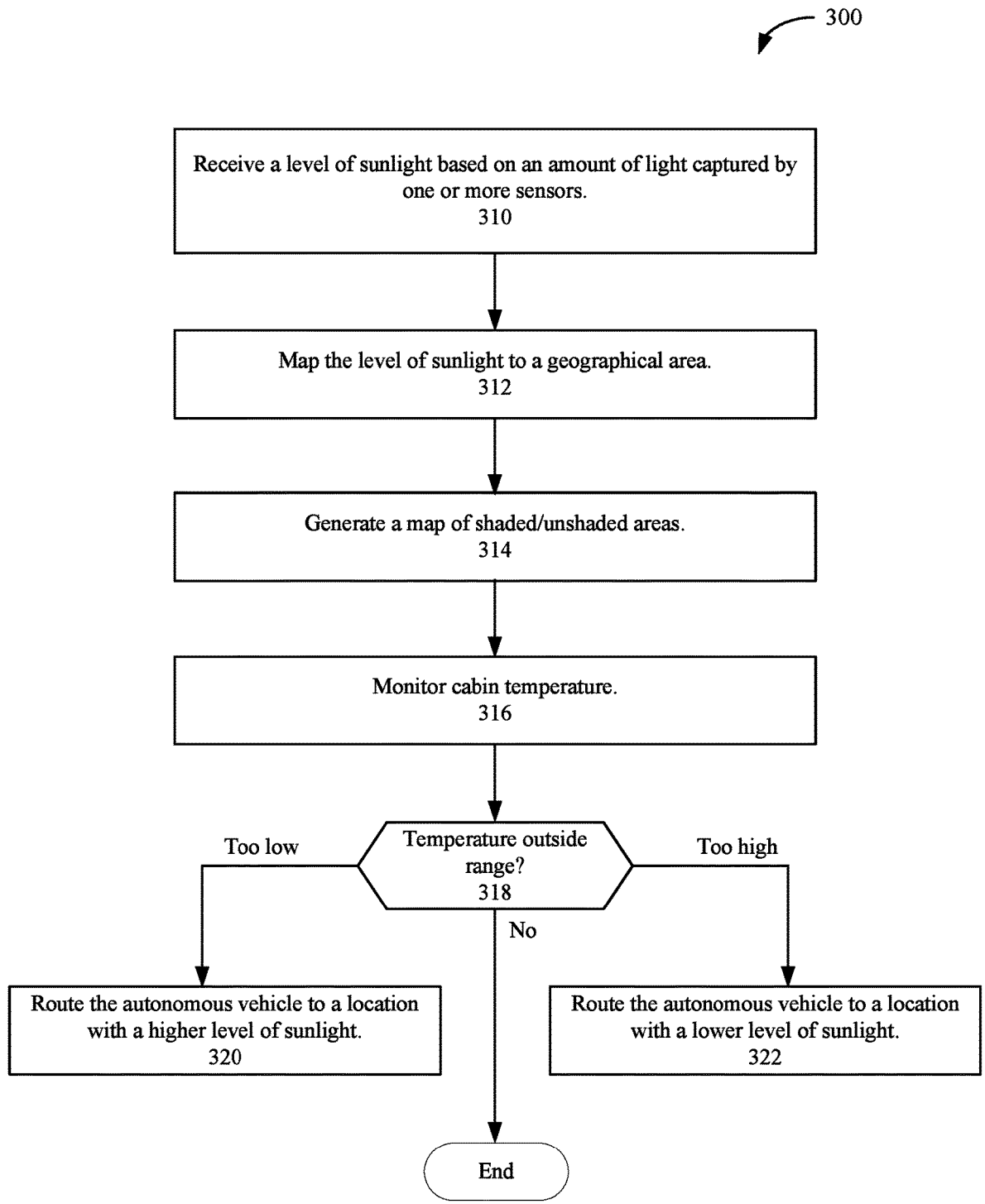
FIG. 3 illustrates a flowchart representation of reducing power draw of an autonomous vehicle, in accordance with some embodiments.

FIG. 3 illustrates a flowchart representation of reducing power draw of an autonomous vehicle, in accordance with some embodiments. Method 300 describes a process for constructing a map of shady/non-shady areas that can begin by receiving, by network 232, a level of sunlight based on an amount of light captured by one or more sensors (step 310). For example, autonomous vehicle 202 can include one or more sensors, such as photoreceiver sensor(s) 204, which can detect ambient light conditions. The amount of light, such as the amount of sunlight falling through the windshield of autonomous vehicle 202, can correlate with the amount of natural heat inside the autonomous vehicle. More light, for example, can indicate higher temperatures within autonomous vehicle 202 than lower light conditions.

In some embodiments, photoreceiver sensor(s) 204 can be located internally and/or externally to autonomous vehicle 202, such as behind a windshield of the autonomous vehicle 202, mounted on the outside of the autonomous vehicle 202, etc. Moreover, cameras (not shown) can be used to detect levels of some lighter shade and decouple whether lower light levels are due to sunlight levels or other reasons that can temporarily confuse the data (e.g., cloudy or foggy weather, passing pedestrians or passing vehicles, parked trucks, etc.). In some embodiments, data from the photoreceiver sensor(s) 204 and/or cameras can be stored locally to autonomous vehicle 202 in data store 208.

In some embodiments, autonomous vehicle 202 can include temperature sensor(s) 206, which can be located internally (e.g., the cabin of autonomous vehicle 202) or externally. Temperature sensor(s) 206 can detect internal temperature conditions, such as the temperature within the cabin where passengers or transported goods are located. In some implementations the temperature measured by temperature sensor(s) 206 can be stored locally to autonomous vehicle 202 in data store 208. The data within data store 208 can in some embodiments be transmitted or uploaded to network 232. In some embodiments, a portion of analysis can be done locally to autonomous vehicle 202 before being transmitted to network 232. For example, internal analysis service 210 can, via the temperature and light level data stored in data store 208, correlate light levels to actual cabin temperature in an analysis to build a model describing how temperature is affected by sunlight levels within the cabin.

Network 232 can receive data from the different types of sensors on autonomous vehicle 202 that detect temperature and light (e.g., data from data store 208), and then collect and aggregate that data. In some embodiments, the data stored on vehicle (e.g., data store 208) can be sent over cellular data to network 232 on a periodic or continuous basis. Another option could be to collect data on the vehicle (data store 208), and instead of paying for cellular data, wait until autonomous vehicle 202 gets back to a facility to transfer the data off via WiFi to network 232.

In some embodiments, based on the temperature and light level data, network 232 can map measured levels of sunlight to a geographical area (step 312). For example, analysis service 216 can correlate the temperature of autonomous vehicle interior (such as its cabin) to measured light levels according to one or more models within models 214. In one or more embodiments, the measured light levels can be further associated with location data via location service 220, which can monitor the current location of autonomous vehicle 202 by on board GPS sensors, to generate a map of shaded/non-shaded areas (step 314). For example, mapping service 222 can generate maps of shaded areas using models that correlate the data from analysis service 216 and location service 220. The maps of shaded/non-shaded areas can be applied by system 200 to take advantage of routes that include areas with more light or more shade in order to lower the cost of operating the fleet 226 (e.g., by lowering power draw from the on board HVAC system 230 on each autonomous vehicle).

For example, if autonomous vehicle 202 is left out in the sun, the interior of the autonomous vehicle 202 can increase in temperature without heat assistance from an HVAC system 230. The heat from the sun can be trapped within the interior of the autonomous vehicle 202, thereby acting as its own heating system. Conversely, if autonomous vehicle 202 is left in the shade (or drives in a shaded area or parks within a tall building's shadow), the autonomous vehicle 202 becomes cooler. Autonomous vehicle 202 can then regulate its interior temperature by seeking out shady areas when it gets too hot and sunny areas when it gets too cold. For example, using photoreceiver sensor(s) 204, usually located somewhere at the bottom of the windshield in the front by the dashboard, autonomous vehicle 202 can detect how much sunlight there is while the autonomous vehicle 202 is driving around a city as it normally would. Autonomous vehicle 202 could collect data as it is operating, as well as other autonomous vehicles within fleet 226, and then send that data back to network 232 to generate, modify, or refine models 214. Over time, the fleet 226 of autonomous vehicles operating independently of each other, each driving around the city, can generate a detailed map of shaded areas.

In some embodiments, models 214 and/or the maps generated by mapping service 222 can be continuously trained as fleet 226 drives throughout the city. If a threshold number of autonomous vehicles (or an average number of autonomous vehicles) register higher or lower levels of light than expected from the maps, then models 214 and/or the maps can be modified to reflect the actual measurements of shady vs. non-shady areas.

In some embodiments, the maps can be supplemented with third party location information. For example, location service 220 can supplement its location information with third party maps or similar services, especially areas in which the fleet 226 does not or cannot drive within. These areas can be new parking facilities or specific properties that the fleet 226 may have been newly granted access.

Models 214 may in some embodiments take weather or environmental conditions into account when generating models 214 and/or the maps from mapping service 222. Areas of shade can constantly change based on many factors, such as the position of the sun, buildings, pedestrians, or other obstacles within the city. Analysis service 216 can attribute fluctuations in the level of sunlight to these factors, and can inform models 214 so that the maps accurately reflect shady areas. In the case of weather (such as cloudiness, rain, fog, etc. that reduces normal sunlight incidence), cameras located within and outside of the cabin can be used in addition to the photoreceiver sensor(s) 204 to determine that lower light levels are temporarily caused by the weather. In some embodiments, weather data from outside services, such as weather service 218 (e.g., data from the National Oceanic and Atmospheric Administration), can refine models 214 and mapping service 222.

Fluctuations in the level of sunlight can also reflect changes in the time of day or time of year. For example, the way shadows move across the city and throughout the day can vary throughout different periods of the year, as the sun moves higher or lower in the sky depending upon the season. Mapping the level of sunlight to a geographical area can be done with respect to these daily and yearly changes—e.g., with respect to varying periods of time. Based on the period of time, a map of shaded areas that are based on a time of day and/or time of year as the sun changes its position in the sky can be generated. In other words, the amount of light in a given location may be based on time, which may be a point in time (e.g. 6:00 PM PST on January 1), a range of time (e.g. 11 AM PST to 1 PM PST from April 1 to May 30), or other suitable measurement of time. Autonomous vehicle 202 can then be routed in accordance with the map based on the current time.

Once the maps of shaded areas are generated, the autonomous vehicle 202 can be routed according to the maps in order to maintain a desired temperature range within the cabin. Cabin temperature, then, can be monitored (step 316) as the autonomous vehicle 202 operates or parks. For example, cabin temperature can be monitored via temperature sensor(s) 206 located within the cabin of the autonomous vehicle 202. The temperature can be measured with respect to a desired temperature range at which the cabin of autonomous vehicle 202 should be kept. If the monitored temperature is within the temperature range (step 318), then method 300 ends. However, if the temperature is outside the temperature range (step 318), then the autonomous vehicle 202 can be routed such that the temperature is brought back within the desired temperature range. In some embodiments, an option for the autonomous vehicle 202 to skip a routing change can be taken, if the weather/sunlight would not improve the cabin temperature (this essentially is an option to turn off the feature).

The desired temperature range could be comfortable for human habitation and/or an optimal range for goods that are being transported. In some embodiments the temperature range can depend on data relating to customer preferences. For example, customers can have a profile that can inform temperature settings when they get into the autonomous vehicle 202. If in the past the customer has modified the temperature to be warmer or cooler than the default temperature range, then that feedback from the customer can be taken into account and the desired temperature range adjusted accordingly to customize the customer's experience. In some embodiments, the customer profile can be developed through an application on a mobile device and/or through tablets in autonomous vehicle 202 that can include adjustable temperature controls when the customer is sitting in a seat within the autonomous vehicle 202.

The desired temperature range can be related to the delivery of goods instead of, or in addition to, human passenger comfort. For example, autonomous vehicle 202 can deliver pizza or other similarly warm, edible products. Autonomous vehicle 202 can be driven in such a way that preserves the temperature of the deliverable good, such as high sunlight routes for warm takeout or shadier routes for cooler desserts.

As a result, based on a temperature within the autonomous vehicle 202 being outside the temperature range, autonomous vehicle 202 can be routed based on the map of shaded areas in order to bring autonomous vehicle 202 back within the desired temperature range. If the temperature is below the temperature range, then autonomous vehicle 202 can be routed to a location with a higher level of sunlight (step 320). For example, analysis service 216 can determine that a temperature of a cabin of autonomous vehicle 202, as measured by temperature sensor(s) 206, has fallen below a threshold temperature (e.g., the minimum of the temperature range). Based on that determination, routing service 224 can generate a route to locations determined by mapping service 222 to have higher levels of sunlight. Routing service 224 can then send instruction to control service 212 to operate autonomous vehicle 202 along the generated route in order to warm up the cabin.

Similarly, if the temperature is above the temperature range, then autonomous vehicle 202 can be routed to a location with a lower level of sunlight (step 322) in order to cool it down. For example, analysis service 216 can determine that the temperature of the cabin of autonomous vehicle 202, as measured by temperature sensor(s) 206, has risen above a threshold temperature (e.g., the maximum of the temperature range) and needs to be lowered. Based on that determination, routing service 224 can generate a route to locations determined by mapping service 222 to have lower levels of sunlight (e.g., higher levels of shade). Routing service 224 can then send instruction to control service 212 to operate autonomous vehicle 202 along the generated route.

In some embodiments, routing service 224 can dispatch the fleet 226 of autonomous vehicles using weighted algorithms, where keeping temperature consistent is one of many factors to be weighted in the generation of each route taken by an autonomous vehicle. Some additional factors can be traffic congestion along certain routes, which could override temperature management concerns if the route takes too long to traverse. Other weighted factors can be high or low parking demands, speed of the route, safety, etc. Moreover, in some embodiments if there are multiple lanes, such as four or five lanes to choose from on a given route, then routing service 224 can choose a particular lane versus the other lanes depending on the amount of shade and temperature needs of the cabin.

In some embodiments, autonomous vehicle 202 can employ automatic shades 234. For example, if the autonomous vehicle 202 is parked in a sunny area (as detected by the level of light detected by photoreceiver sensor(s) 204), the automatic shades 234 can extend across the windshield to decrease the amount of sunlight within the cabin. Conversely, the autonomous vehicle 202 can move to a sunnier area to park if photoreceiver sensor(s) 204 detects that it's in a shady area. In some embodiments, the automatic shades 234 can take the form of smart glass, darkening or lightening in response to light levels detected by photoreceiver sensor(s) 204.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 4:
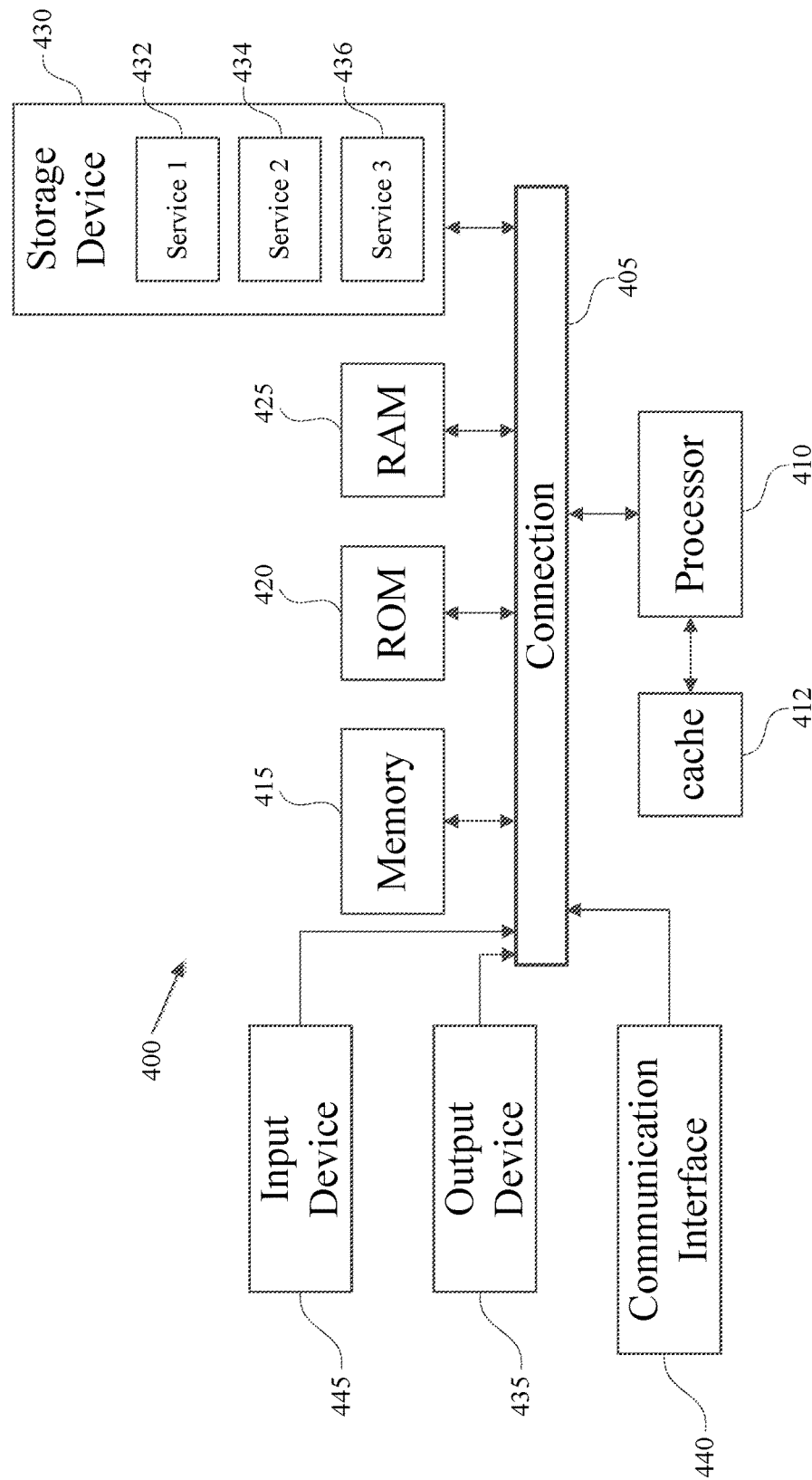
FIG. 4 shows an example of a system for implementing certain aspects of the present technology.

FIG. 4 shows an example of computing system 400, which can be for example any computing device making up AV internal computing system 110, remote computing system 150, (potential) passenger device executing rideshare application 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method to reduce power draw in an autonomous vehicle, the method comprising:
   receiving a level of sunlight based on an amount of light captured by one or more sensors;
   mapping the level of sunlight to a geographical area to generate a map of shaded areas; and
   based on a temperature within the autonomous vehicle being outside a temperature range, routing the autonomous vehicle based on the map of shaded areas to bring the autonomous vehicle within the temperature range.

2. The method of claim 1, wherein the one or more sensors are photo receiver sensors that detect ambient light conditions, and wherein the one or more sensors are located behind a windshield of the autonomous vehicle.

3. The method of claim 1, wherein the map of shaded areas is generated based on mapping levels of sunlight received from a fleet of autonomous vehicles.

4. The method of claim 1, wherein the mapping of the level of sunlight to the geographical area is with respect to time, and the routing of the autonomous vehicle is further based on a current time.

5. The method of claim 1, wherein the temperature is received from a temperature sensor located within a cabin of the autonomous vehicle.

6. The method of claim 1, further comprising:
   determining that a temperature of a cabin of the autonomous vehicle has fallen below a threshold temperature; and
   based on the determination, routing the autonomous vehicle to a location with a higher level of sunlight.

7. The method of claim 1, further comprising:
   determining that a temperature of a cabin of the autonomous vehicle has risen above a threshold temperature; and
   based on the determination, routing the autonomous vehicle to a location with a lower level of sunlight.

8. A non-transitory computer readable medium comprising instructions, the instructions, when executed by a computing system, cause the computing system to:
   receive a level of sunlight based on an amount of light captured by one or more sensors of an autonomous vehicle;
   map the level of sunlight to a geographical area to generate a map of shaded areas; and
   based on a temperature within the autonomous vehicle being outside a temperature range, route the autonomous vehicle based on the map of shaded areas to bring the autonomous vehicle within the temperature range.

9. The non-transitory computer readable medium of claim 8, wherein the one or more sensors are photo receiver sensors that detect ambient light conditions, and wherein the one or more sensors are located behind a windshield of the autonomous vehicle.

10. The non-transitory computer readable medium of claim 8, wherein the map of shaded areas is generated based on mapping levels of sunlight received from a fleet of autonomous vehicles.

11. The non-transitory computer readable medium of claim 8, wherein the mapping of the level of sunlight to the geographical area is with respect to time, and the routing of the autonomous vehicle is further based on a current time.

12. The non-transitory computer readable medium of claim 8, wherein the temperature is received from a temperature sensor located within a cabin of the autonomous vehicle.

13. The non-transitory computer readable medium of claim 8, the instructions further causing the computing system to:
   determine that a temperature of a cabin of the autonomous vehicle has fallen below a threshold temperature; and
   based on the determination, route the autonomous vehicle to a location with a higher level of sunlight.

14. The non-transitory computer readable medium of claim 8, the instructions further causing the computing system to:
   determining that a temperature of a cabin of the autonomous vehicle has risen above a threshold temperature; and
   based on the determination, routing the autonomous vehicle to a location with a lower level of sunlight.

15. A system comprising:
   one or more sensors of an autonomous vehicle for capturing a level of sunlight; and
   a processor for executing instructions stored in memory, wherein execution of the instructions by the processor executes:
      receiving the level of sunlight captured by the one or more sensors;
      mapping the level of sunlight to a geographical area to generate a map of shaded areas; and
      based on a temperature within the autonomous vehicle being outside a temperature range, routing the autonomous vehicle based on the map of shaded areas to bring the autonomous vehicle within the temperature range.

16. The system of claim 15, wherein the map of shaded areas is generated based on mapping levels of sunlight received from a fleet of autonomous vehicles.

17. The system of claim 15, wherein the mapping of the level of sunlight to the geographical area is with respect to time, and the routing of the autonomous vehicle is further based on a current time.

18. The system of claim 15, wherein the temperature is received from a temperature sensor located within a cabin of the autonomous vehicle.

19. The system of claim 15, wherein execution of the instructions by the processor further executes:
   determining that a temperature of a cabin of the autonomous vehicle has fallen below a threshold temperature; and
   based on the determination, routing the autonomous vehicle to a location with a higher level of sunlight.

20. The system of claim 15, wherein execution of the instructions by the processor further executes:
   determining that a temperature of a cabin of the autonomous vehicle has risen above a threshold temperature; and
   based on the determination, routing the autonomous vehicle to a location with a lower level of sunlight.

* * * * *